United States Patent [19] [11] Patent Number: 4,747,302
Goss [45] Date of Patent: May 31, 1988

[54] MOUNTING FIXTURE FOR END-OF-TRAIN DEVICE OR THE LIKE

[75] Inventor: John H. Goss, Fayetteville, Ark.

[73] Assignee: American Railroad Technology, Inc., Fayetteville, Ark.

[21] Appl. No.: 15,145

[22] Filed: Feb. 17, 1986

[51] Int. Cl.⁴ .............................................. G01L 5/28
[52] U.S. Cl. ...................................... 73/129; 116/30; 248/231.1
[58] Field of Search ................ 73/432.1, 121, 431, 73/129; 116/30; 248/323, 333, 327, 651, 656, 658, 552, 231.4, 225.31, 228, 230, 231.1; 188/153 R; 213/76, 77; 246/473 R; 70/10

[56] References Cited

U.S. PATENT DOCUMENTS

| 127,877 | 6/1872 | Harris | 116/30 |
|---|---|---|---|
| 1,110,495 | 9/1914 | Kobert | 248/231.1 |
| 1,328,732 | 1/1920 | Harms | 248/231.1 |
| 2,641,686 | 6/1953 | Carruthers | 116/30 |
| 4,066,231 | 1/1978 | Bahner et al. | 248/552 |
| 4,308,733 | 1/1982 | Tampa | 248/552 |
| 4,466,596 | 8/1984 | Cohen | 248/231.4 |
| 4,592,217 | 6/1986 | Fernandez et al. | 73/129 |
| 4,665,858 | 5/1987 | Harrigal et al. | 116/30 |
| 4,669,577 | 6/1987 | Werner | 248/231.4 |
| 4,691,563 | 9/1987 | Martin | 73/129 |

Primary Examiner—Stewart J. Levy
Assistant Examiner—Robert R. Raevis
Attorney, Agent, or Firm—Robert R. Keegan

[57] ABSTRACT

There is disclosed a fixture for mounting an end of train marker light and/or other electronic apparatus to a railroad freight car coupler including an upright tubular member through which a threaded rod passes and extends into and through the flag hole in a standard railroad coupler; a frustro-conical enlargement at the bottom end of the tubular member seats in the top of the flag hole, and a frustro-conical collar threaded on the bottom of the rod is urged upward by rotating the rod to clamp the fixture in the flaghole. The top of the rod has a horizontal bar which is used to manually rotate the rod, and a keyed sleeve at the top of the tube may be raised to engage the bar to prevent its rotation while a padlock is secured through holes provided in the top of the sleeve.

14 Claims, 2 Drawing Sheets

MOUNTING FIXTURE FOR END-OF-TRAIN DEVICE OR THE LIKE

The present invention relates to mounting fixtures for end of train devices to secure a housing with telemetry apparatus and a marker light to the coupler of the rearmost car of a freight train. There is an on-going movement to replace the traditional caboose on freight trains with an electronic box that fits on the coupler of the last car of the train. It is quite important to have means for fastening such a box or housing on a train coupler which is rugged and secure and at the same time may be moved from one car coupler to another with little difficulty. Preferably the means for fastening the electronic housing (and marker light) should be locked in place by a conventional general purpose padlock used in railroad operations. Furthermore, the mounting fixtures should not interfere with the normal operation of the coupler allowing the coupler to be used even while the end of train device is in place.

The marker light which also is secured by the mounting fixture generally has a rather narrow beam which needs to be maintained in alignment with the longitudinal axis of the coupler and thus the mounting fixture should maintain the end of train device including the marker light firmly in position in all axes.

Previous approaches to mounting devices on railroad car couplers have not provided the features and advantages which characterize the mounting fixture of the present invention. An example of such previous mounting fixtures for end of train devices is shown in U.S. Pat. No. 4,520,662 for Coupler Mount Assembly granted to Hartmut Schmid, June 4, 1985, U.S. Class 73-129.

It will be noted that the Schmid device as well as other known devices is troublesome to attach or detach and it disables the coupler for normal operation.

SUMMARY

The mounting fixture according to the present invention is secured in a flag hole of the coupler (the flag hole is a standard feature of railroad coupler in the United States and other countries following United States standards). The mounting fixture of the invention thus does not require that the coupler be open or closed, and it is not necessary to remove the end of train device in the yards when coupling to or uncoupling from the coupler on which it is mounted. Of course, the end of train device and particularly the marker light must be placed on the end car of the train during mainline operation of the train.

The mounting fixture of the present invention is very easy to attach and detach from a coupler since it employs a screw clamp arrangement with clamping elements preferably of frustro-conical shape seated in the bottom and top mouth of the flag hole and urged together by a screw element extending through the flag hole. The mounting fixture is thus secured with a vicelike grip on the coupler until the screw element is turned to release the grip. A locking arrangement accepts the conventional railroad key-operated padlock and prevents unauthorized rotation of the screw element for removal of the mounting fixture (with the end of train device) from the coupler.

Notwithstanding the secure and rigid attachment provided by the mounting fixture, it is characterized by minimal bulk and adds about 10 pounds or less to the weight to the end of train device depending on the metal or other material of which it is constructed. The mounting fixture of the invention also has the advantage of supporting the marker light and electronics housing above the coupler where the elevation of the marker light enhances its visibility.

In addition to the above-described advantages and features of the invention, it is an object of the present invention to provide a mounting fixture for securing electronic equipment or the like to the coupler of a railcar wherein the mounting fixture is secured in the standard flaghole of a coupler with a threaded screw element passing through the flaghole and serving to clamp a mating threaded collar of frustro-conical shape in the bottom mouth of the flaghole.

It is another object of the present invention to provide a mounting fixture for an end of train device or like consisting essentially of a vertical rod mounted in the coupler flaghole and provided with a fastening means thereon spaced above the coupler for noninterference therewith.

It is still another object of the present invention to provide a mounting fixture for an end of train device which is secured on the coupler with a screwclamp arrangement for frictional engagement with upper and lower surfaces of the coupler and wherein a locking device is provided cooperating with a standard railroad padlock to prevent unclamping of the fixture for removal of the device.

BRIEF DESCRIPTION OF THE DRAWINGS

Other objects and advantages of the invention will be apparent from consideration of the following description in conjunction with the appended drawings in which.

DETAILED DESCRIPTION

Figure 1:
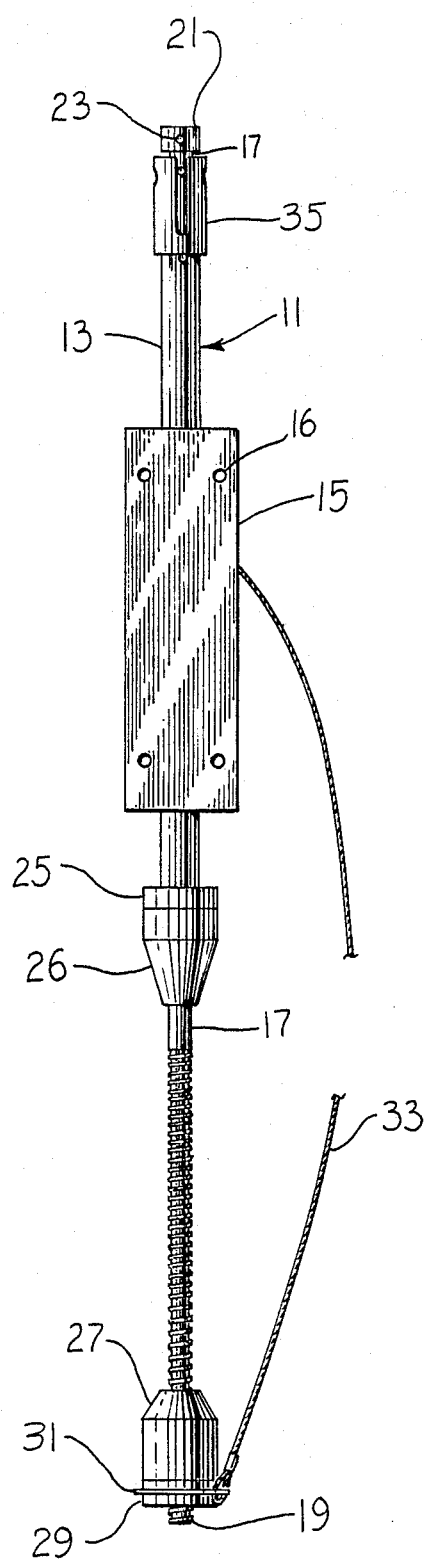
FIG. 1 is a front elevational view of a mounting fixture for an end of train device according to the present invention.
Figure 2:
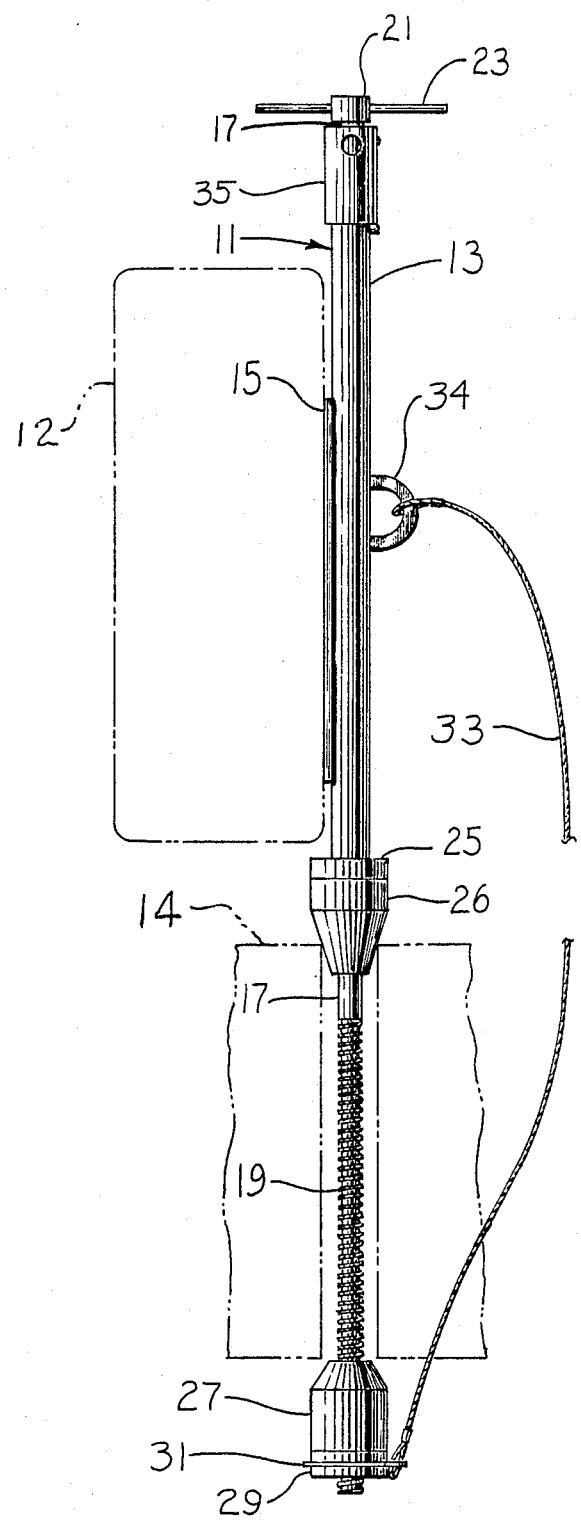
FIG. 2 is a side elevational view of the apparatus of FIG. 1 including a fragmentary showing in phantom lines of a coupling and electronics housing with which it would be used.

Referring now to the drawings and particularly FIGS. 1 and 2, a mounting fixture 11 according to the invention is illustrated having an upright portion 13 in the form of a hollow tube to which is affixed by welding or otherwise a mounting plate 15 having mounting holes 16 for the attachment of a housing for electronic equipment (including an end of train marker light) as shown in phantom lines at 12 in FIG. 2. Metal parts of the fixture may be made of steel or a lighter alloy. The particular size or shape of the housing 12 is not critical to the present invention, and the fixture 11 of the invention is capable of providing a mounting for a housing or box of various sizes and shapes for electronic apparatus, batteries, marker lights and other apparatus.

A rod 17 extends through tube 13 and has a threaded portion 19 at its lower end. The entire rod 17 may be threaded but only a bottom portion is required to be threaded for the operation of the specific embodiment illustrated. A cap 21 on the top of rod 17 limits the downward movement of rod 17 relative to tube 13 while a bar 23 provides a firm grip for manually rotating rod 17.

Figures 3, 4:
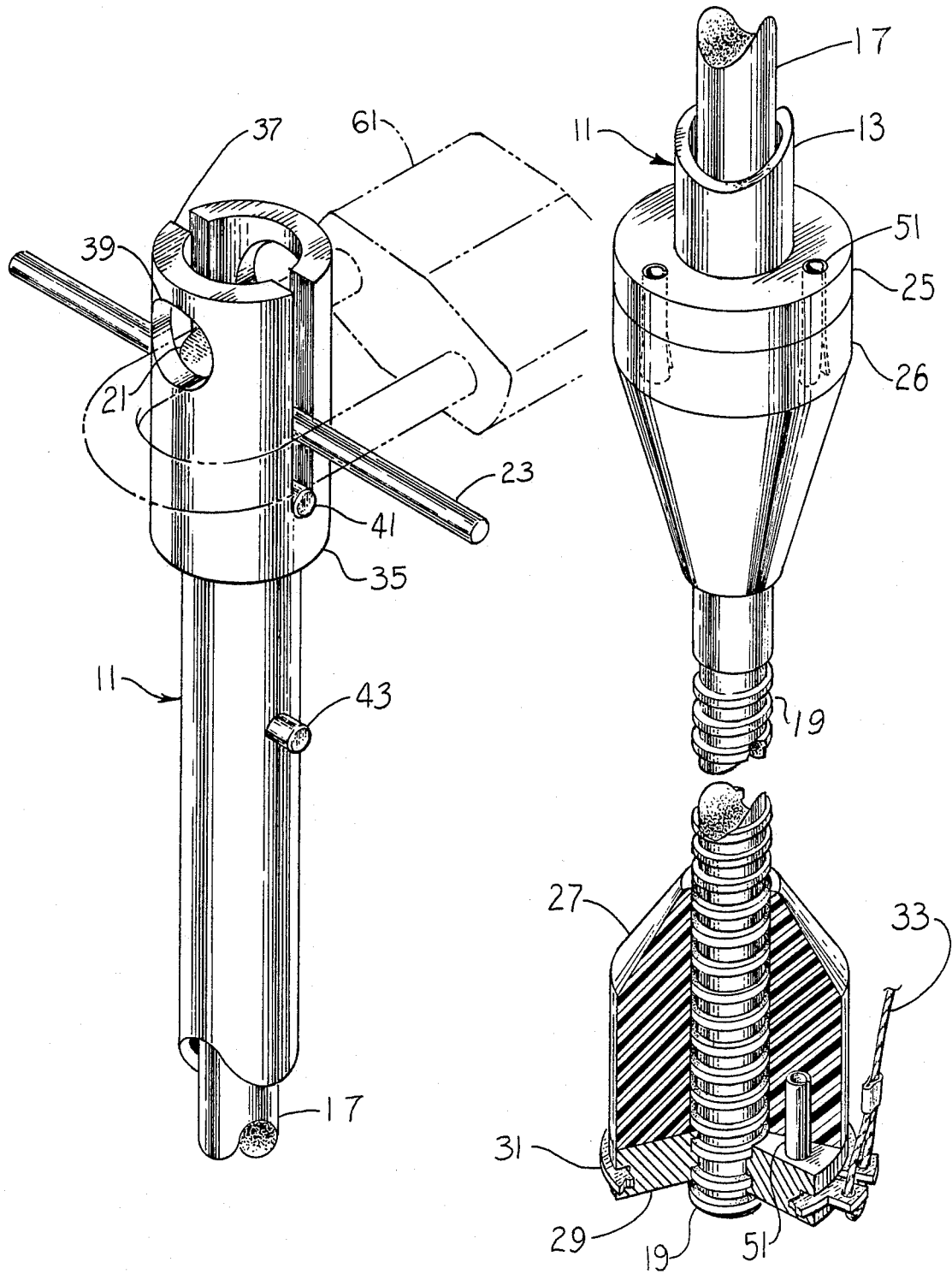
FIG. 3 is an enlarged fragmentary isometric view of the top of the device of FIG. 1 showing its use in conjunction with a conventional padlock (shown in phantom lines)
FIG. 4 is an enlarged fragmentary isometric view partially broken away showing details of the apparatus of FIGS. 1 and 2.

A larger diameter hollow member 25 on the bottom of tube 13 is provided with a frustro-conical portion 26 preferably of plastic material (such as polyurethane or other semi-rigid plastic) with good frictional engagement capability when placed in the flat hole of a railway car coupling such as shown in phantom lines at 14 in FIG. 2. As shown in FIG. 4, cone 26 may be secured to member 25 by split ring fasteners 51.

A collar for clamping in the bottom mouth of the flaghole of coupling 14 is formed by plastic cone 27 secured to metal ring 29 which is internally threaded to mate with threaded portion 19 of rod 17. A snap ring 31 resides in a groove on metal ring 29 providing an attachment point for a cable 33 which is also attached to ring 34 secured on tube 13. This or some similar arrangement preferably is provided to keep the collar comprising cone 27 and ring 29 from being separated from the mounting fixture 11.

The structure of cone 27 and threaded metal ring 29 is shown in FIG. 4 together with split ring fateners 51 which may be utilized to secure the two together. Machine screws or other fasteners may alternatively be employed for that purpose. Cone elements 26 and 27 may be of similar construction as illustrated in FIG. 4; in this preferred arrangement the angle of cone 26 is about 18 degrees while the angle of cone 27 is about 37 degrees. Although such conical shapes are preferred the shape of the portions of the mounting fixture engaging the top and bottom mounts of the flaghole is subject to wide variation. Also the semi-rigid plastic material preferred for cones 26 and 27 may be replaced in one or both cones by other material such as metal without departing from the spirit of the invention.

In order to prevent undesired detachment of the mounting fixture 11 from a railway car coupling a slotted ring 35 is provided at the top of tube 13 which is captured for limited longitudinal movement between pins 41 and 43 on tube 13.

When bar 23 is arranged as shown in FIG. 3 ring 35 may be lifted to lock bar 23 against rotation due to its restraint by slots 37 and pin 41. Ring 35 may then be maintained in the lifted and locking position by placing a padlock at 61 shown in phantom lines through holes 39 provided in the top of ring 35. Holes 39 are of a size and shape such that the shackle of a padlock may be placed through only one hole or both holes.

While the operation of the mounting fixture is simple and generally clear from the previous description, a summary of its operation follows. First of all, the electronic housing 12 or whatever apparatus is to be mounted by means of the mounting fixture 11 is normally secured in place on the fixture 11 in a permanent or semipermanent manner with rivets, screws, or the like. When it is desired to mount the fixture on the coupling of a railway car the metal ring 29 together with cone 27 is threaded off of the bottom portion 19 of rod 17 so that rod 17 can be placed through the flaghole of the coupling 14 as shown in FIG. 2.

Metal ring 29 is then started with one rotation more or less on the threaded portion 19 of rod 17 after which bar 23 is rotated clockwise to cause cones 26 and 27 to close together to clamp on coupler 14. Bar 23 and rod 17 may be lifted up to keep cone 27 in engagement with the bottom of coupler 14 to keep cone 27 from rotating while rod 17 is rotating. At least one of cones 26 or 27 is preferably formed of a slightly deformable plastic such as polyurethane or the like so that cones 26 and 27 very securely grip coupler 14 when bar 23 is hand tightened moderately tight. Bar 23 is oriented so that it is in alignment with slots 37, and ring 35 is lifted up to allow padlock 61 to be positioned with its shackle through holes 39 and locked in place. At this point fixture 11 is vertically oriented and securely locked relative to coupler 14. Tube 11 is restrained against rotation relative to coupling 14 by the frictional engagement of cone 26 in the flaghole of coupling 14. Thus the orientation of the housing 12 and any marker light that might be mounted thereon will be maintained in spite of accelerations or vibrations encountered in railroad operations. Bar 23 cannot be rotated to release cone 27 while ring 35 is held in the locking position by padlock 61.

When it is desired to remove the mounting fixture 11 and the apparatus housing 12 from a railroad car coupling to place it on a different railway car or for another purpose then the steps described above are performed in the reverse order.

From the foregoing description and explanation it will be seen that a mounting fixture for mounting a housing containing electronic apparatus or for mounting other equipment on the coupling of a railway car is provided which is noably simple in structure and yet rugged and suitable for the harsh environment to which it is exposed. The equipment is furthermore reasonably secure against unauthorized removal by vandals and other unauthorized tampering. Furthermore, its installation is simple and requires a minimum of training or instruction.

It will be recognized that the specific structure of apparatus according to the invention is subject to wide variation and modification and that in addition to the vibrations or modifications shown or suggested, other variations will be apparent to those skilled in the art and accordingly the scope of the invention is not to be considered to be limited to the particular embodiments shown or suggested but is rather to be determined by reference to the appended claims.

What is claimed is:

1. A fixture for mounting an apparatus housing to a railcar coupler in the flag hole thereof comprising:
    an elongated, at least partially threaded, rod adapted to pass through a rail coupler flag hole,
    an upright member having an elongated vertical channel through which the upper end of said rod extends, said member having an enlargement at the lower end, larger than said hole and with a conformation adapted to frictionally engage in said hole,
    fastening means on said upright member for securing an apparatus housing thereto,
    stop means for limiting the downward longitudinal movement of said rod relative to said upright member,
    a collar threadedly engageable on the lower end of said rod, said collar being larger than said hole with a conformation adapted to frictionally engage in the lower mouth of said hole,
    grip means at the top of said rod for facilitating rotation of said rod thereby causing said collar to be forced upward to securely engage in said hole, and
    means on said upright member lockable to prevent rotation of said rod relative thereto and release of said collar from engagement with the bottom mouth of the hole in said coupler, whereby said rod may be secured and locked in the coupler flaghole with the coupler gripped at top and bottom by said enlargement on the bottom of said upright member and said threaded collar respectively, so that the apparatus housing mounted by said fixture is completely restrained relative to said coupler.

2. Fixture as recited in claim 1 wherein said upright member includes a metal tube forming said channel and said rod has a diameter slightly less than the inside diameter of said tube.

3. Fixture as recited in claim 2 wherein said means facilitating rotation of said rod includes a bar secured transversely at the top of said rod and said means on said upright member includes a ring having slots therein keyed to said tube and slidable to capture said bar in its slots.

4. Fixture as recited in claim 2 wherein said means for limiting the movement of said rod includes a cap at the top thereof acting as a stop against said tube limiting downward longitudinal movement of said rod.

5. Fixture as recited in claim 1 wherein said collar includes a frustro-conical plastic portion.

6. Fixture as recited in claim 1 wherein said upright member has at its lower end a frustro-conical plastic portion.

7. Fixture as recited in claim 1 further including a cable connecting said collar to said upright member.

8. A fixture for mounting an apparatus housing to a railcar coupler in the flag hole thereof comprising:
an elongated, at least partially threaded, rod adapted to pass vertically through a rail coupler flag hole,
an upright member having a channel through which the upper end of said rod extends, said member having a lower end larger than said hole,
means on said upright member for securing an apparatus housing thereto,
means for limiting the movement of said rod relative to said upright member,
a collar threadedly engageable on the lower end of said rod, said collar being larger than said hole with a conformation adapted to frictionally engage in the lower mouth of said hole,
means for facilitating manual rotation of said rod thereby causing said collar to be forced upward to securely engage in said hole, and
means on said upright member lockable to prevent rotation of said rod relative thereto and undesired release to said collar from engagement with the bottom mouth of the hole in said coupler,
whereby said rod may be secured and locked in the coupler flaghole with the coupler gripped at the bottom by said threaded collar so that the apparatus housing mounted by said fixture is restrained relative to said coupler.

9. Fixture as recited in claim 8 wherein said upright member includes a metal tube forming said channel and said rod has a diameter less than the inside diameter of said tube.

10. Fixture as recited in claim 9 wherein said means for facilitating manual rotation of said rod includes a bar secured transversely at the top of said rod and said means on said upright member includes a ring having slots therein keyed to said tube and slidable to capture said bar in its slots.

11. Fixture as recited in claim 9 wherein said means for limiting the movement of said rod includes a cap at the top thereof acting as a stop against said tube limiting downward longitudinal movement of said rod.

12. Fixture as recited in claim 8 wherein said collar includes a frustro-conical plastic portion.

13. Fixture as recited in claim 8 wherein said upright member has at its lower end a frustro-conical portion.

14. Fixture as recited in claim 8 further including a cable connecting said collar to said upright member.

* * * * *

UNITED STATES PATENT AND TRADEMARK OFFICE
CERTIFICATE OF CORRECTION

PATENT NO. : 4,747,302
DATED : May 31, 1988
INVENTOR(S) : John H. Goss

It is certified that error appears in the above-identified patent and that said Letters Patent are hereby corrected as shown below:

In Column 6, line 12 (Claim 8) change "to" to --of--.

Signed and Sealed this

Twenty-fifth Day of October, 1988

*Attest:*

DONALD J. QUIGG

*Attesting Officer*  *Commissioner of Patents and Trademarks*